United States Patent

[11] 3,532,142

[72] Inventor Harold B. Ziegler
 8723 Magnetic, El Paso, Texas 79904
[21] Appl. No. 727,915
[22] Filed May 9, 1968
[45] Patented Oct. 6, 1970

[54] SCREWDRIVER GUIDE ASSEMBLY
 9 Claims, 6 Drawing Figs.

[52] U.S. Cl. .................................................... 145/50
[51] Int. Cl. ..................................................... B25b 15/00
[50] Field of Search ........................................... 145/50(—5), 51, 50, 52

[56] References Cited
 UNITED STATES PATENTS
 3,298,410 1/1967 Morifuji .................. 145/52

FOREIGN PATENTS
336,934 5/1921 Germany ................. 145/51
34,047 7/1922 Norway ................... 145/52

Primary Examiner—Robert C. Riordon
Assistant Examiner—Roscoe V. Parker, Jr.
Attorney—Clarence A. O'Brien and Harvey B. Jacobson ABSTRACT: When mounted on a screwdriver the assembly enables the user to start and hold a screw in the manner shown. A rubber adapter collar, which holds and starts the screw, is removably plugged into the forward end of an elongated transparent sleeve slidable on the shank. A two-part flanged bushing is telescoped into the rearward end of the sleeve and is shiftable on the shank. A friction-retained limit stop provides an abutment for a split washer and antifriction ball bearings are interposed between the flange and washer.

Patented Oct. 6, 1970
3,532,142
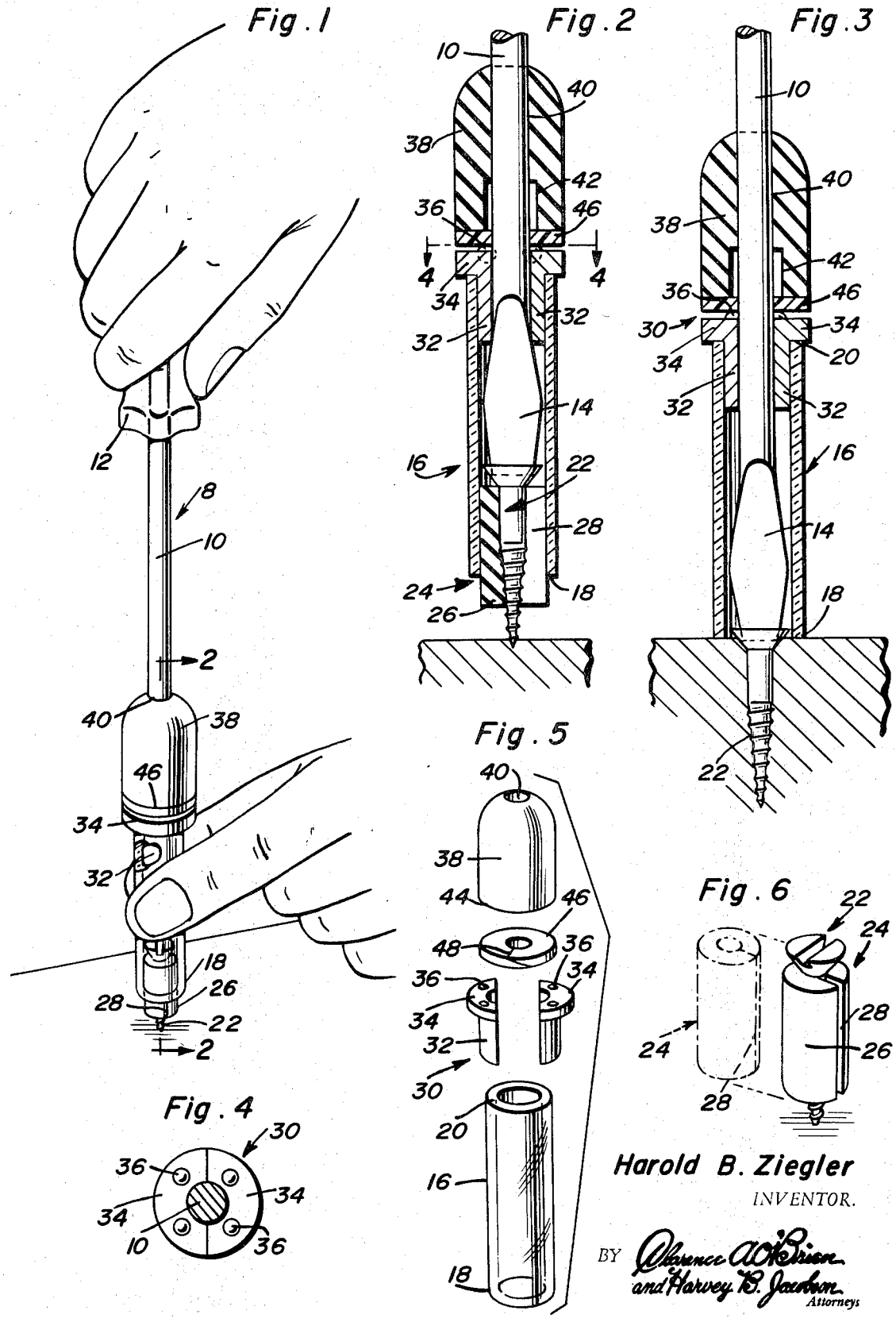

SCREWDRIVER GUIDE ASSEMBLY

This invention relates to devices, commonly categorized as screwdriver attachments, which are operatively mounted in one manner or another on the usual magnetized bit-equipped shank and which assist the user in holding, piloting and starting a screw and pertains to an improved adaptation which, as experience has shown, better serves the purposes for which it has been devised.

Briefly the over-all assembly comprises a plurality of component parts each contributing its proportionate share to the ready-to-use device. A highly significant feature has to do with a rigid elongated clear transparent open-ended guide sleeve of requisite outside diameter and having a bore of a diameter to clear the shouldered portions of the screw-turning bit. The open forward end of the sleeve is provided with screw holding and starting means referred to more specifically as an adapter. This adapter comprises a relatively short collar-like member with an axial bore to accommodate the shank of the screw and which has a slit in one side which opens into the bore and permits the collar to be applied and removed. With the collar applied it can be plugged into the bore at the forward end of the sleeve. With the adapter in place the kerf is lined up for coaction therewith of the bit of the screwdriver. The other, that is, the rearward end of the sleeve is provided with a flanged bushing which is made up of semicircular half sections plugged into the bore and slidingly embracing the shank. The flange means is exposed and pocketed to hold antifriction ball bearings which bear against an end thrust washer. The washer is split and can be sprung over the shank and it is interposed between the flange and a cooperating end portion of a backup and end thrust member which is friction fitted but slidable on the shank.

The object of this invention, generally stated, is to improve upon known prior art attachment-type screw holders and starters and, in so doing, to advance the art to which the invention relates.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective showing a conventional screwdriver with the improved applicable and removable guide assembly in place and suggesting one manner of holding the sleeve and the handle of the screwdriver with a view toward positioning and starting a screw in a suitable workpiece.

FIG. 2 is an enlarged fragmentary view with parts in section and elevation taken approximately on the plane of the section line 2-2 of FIG. 1 and which emphasizes the manner in which a bit is engaged with a screw and the screw is positioned, with the aid of the adapter, in the forward end portion of the sleeve.

FIG. 3 is a view similar to FIG. 2 but with the adapter removed and showing the manner in which the started screw has been driven home.

FIG. 4 is a cross section on the plane of the section line 4-4 of FIG. 2.

FIG. 5 is an exploded perspective view showing the component parts with the adapter omitted.

And FIG. 6 is a view in perspective of the adapter and showing how it is applied in full lines ready for insertion into the sleeve and how the adapter can be removed after the screw has been started and steadied in a seemingly evident manner.

The screwdriver 8 in FIG. 1 is conventional and embodies a shank 10 with a handle or handgrip 12 at the upper end and with the usual blade or bit 14 as best shown in FIGS. 2 and 3. It will be understood that the assembly, which could be described as attachment means, can be applied and removed without altering the screwdriver.

The assembly is made up of the plurality of component parts shown with particularly in FIGS. 5 and 6 respectively. The aforementioned rigid clear transparent barrel or sleeve is denoted by the numeral 16 and is of requisite outside diameter and has a bore of an inside diameter that permits the sleeve to be slid over the bit and shank to permit adjustment of the same as illustrated in FIGS. 2 and 3 respectively. The open forward end of the sleeve is denoted at 18. The rearward open end of the sleeve is denoted at 20. The sleeve is proportional in length with the overall length of the shank of the screwdriver as is satisfactorily illustrated in FIGS. 1 to 3.

Taking up now the insertable and removable adapter for the screw 22 it will be noted that the adapter is denoted by the numeral 24 and comprises a second somewhat shorter sleeve but which will be referred to here as a compressibly resilient collar 26 of a length less than the shank of the screw and having a slit or slot 28 which opens through the periphery of the collar and communicates with the bore so that the collar can be attached as shown in full lines in FIG. 6 and removed at the desired stage as will be hereinafter further explained. The outside diameter of the collar is such that the collar can be compressed slightly and plugged into the bore of the sleeve as shown in FIGS. 1 and 2.

The rearward end portion 20 of the sleeve is provided with an insertable and removable fitting which is here referred to conveniently as a bushing 30. The bushing can also be made of moldable plastic material of an appropriate grade and it comprises a pair of opposed semicircular half portions 32 which can be plugged telescopingly into the bore as shown. The upper or rearward ends of the half sections are provided with lateral half flanges which are denoted at 34 and which have recesses or pockets containing circumferentially spaced slightly projecting antifriction ball bearings 36.

The aforementioned end thrust and limit stop member is denoted by the numeral 38 and it is made of a suitably soft grade of rubber and has a main axial bore 40 which is friction fitted and slidable at will on the shank as shown in FIGS. 2 and 3. The bore is of suitable cross-sectional diameter and there is a counterbore at 42 as shown in FIGS. 2 and 3 to provide the elasticity desired. The forward end portion 44 provides an abutment for the washer 46 which as shown in FIG. 5 is slit as at 48 to permit the washer to be sprung and attached to the shank so that it will occupy a position between the surface 44 and the ball-equipped flange means 34. This washer is sometimes referred to in the instant disclosure as a snap-on bearing race.

It will be evident that the cylindrical barrel or guide sleeve 16 entirely surrounds the blade's shoulder and tip and also pockets the adapter 24 and the screw which is temporarily held therein for starting purposes. The fact that the sleeve is transparent enables the user to line up the bit with the kerf in the head of the screw 22.

The limit stop member 38 is made of soft rubber which after being forced over the blade will fit the shank snugly and will provide the desired shoulder or backup means for the ball race washer 46. The sectional construction of the bushing 30 permits the half portions 32 to be telescopingly plugged into the rearward end 20 in a seemingly evident manner.

It can be pointed out too that the sponge rubber limit stop member 38 must fit snugly on the shank of the screwdriver. The segmental half portions 32 must exactly fit the shank but yet be free to slide thereon and also fit with requisite nicety into the end portion 20 of the bore of the sleeve 16. The guide sleeve must have an inside diameter that will allow it to be slid over the tip, neck and shoulder portions of the screwdriver blade or bit 14. By using a magnetized bit or blade the result desired can be achieved more satisfactorily.

In assembling the component parts one would push the compressibly resilient or sponge rubber limit stop member 38 over the tip and shoulder of the screwdriver blade and would slide it back far enough on the shank to make room for the next step of assembling the other component parts. The sleeve 16 is fitted over the tip, shoulder and neck of the bit or blade. The washer 46 is snapped into position and then the half sections of the flanged bushing are inserted to assume the positions shown best in FIGS. 2 and 3.

With reference again to the applicable and removable adapter 24 it is necessary to wrap it around the screw just below the head of the screw. The screw and adapter can then be pushed into the forward end portion 18 of the sleeve 16 in the manner shown best in FIG. 2 to the point of contact between the screwhead slot and driver bit thus positioning the screw in proper alignment for starting. This may often be a worthwhile convenience particularly when working with soft materials that require no drilled hole such as, for example, soft wood, wallboard, soft sheet metal and the like. With the adapter in place the workman would first position the point of the screw on the mark as suggested in FIG. 2. Then, by delivering a sharp blow to the butt end of the screwdriver handle with the palm of the free hand, the point of the screw is started. After a few turns to firm the screw in place, the guide sleeve 16 is momentarily pulled back so that the adapter can be stripped from the started screw and set aside as suggested in phantom lines in FIG. 6.

The final step of driving the screw home is shown in FIG. 3.

The foregoing is considered as illustrative only of the principles of the invention. Further, since numerous modificatons and changes will readily occur to those skilled in the art, it is not desired to limit the invention to the exact construction and operation shown and described, and accordingly all suitable modifications and equivalents may be resorted to, falling within the scope of the invention as claimed.

I claim:

1. In combination, a conventional screwdriver embodying a shank having a handle at its rearward end and a screw engaging and turning bit at its forward end, an elongated guide sleeve encompassing said bit and an adjacent portion of the shank and having connecting means at a rearward end operatively slidable on said shank and a forward screw enclosing bit piloting end, and screw holding and starting means temporarily and detachably connectible to the shank of a screw, said means being telescopingly but removably lodged in the forward end portion of the bore of said sleeve, whereby the screw can be orientated with the sleeve, bit, and work surface for starting the screw with the bit seated in the usual screwdriver kerf in the head of said screw.

2. The combination defined in and according to claim 1, and wherein said means comprises a relatively short collar-like adapter having an axial bore with a lengthwise expansible and contractable open-ended slit in one side opening into the bore and opening outwardly through the peripheral surface in a manner to permit the adapter to be initially manually attached to the screw and subsequently manually removed from the screw after it has been acceptably and firmly started in the work surface, the outside diameter of said adapter corresponding with the inside diameter of the bore of said guide sleeve, whereby to permit the adapter to be removably plugged into said bore.

3. The combination defined in and according to claim 2, and wherein said guide sleeve is rigid, is made of clear transparent plastic material, is of a length less than the length of said shank, said collar-like adapter being made of compressibly resilient material.

4. The combination defined in and according to claim 1, and wherein the means operatively and slidably connecting the rearward end of said sleeve comprises a bushing which is shiftable lengthwise along said shank and is telescopingly plugged into the bore at the rearward end of said sleeve.

5. The combination defined in and according to claim 4, and wherein said bushing is made up of a pair of semicircular half sections having flanged end portions providing an annular flange, said flange encircling said shank and being disposed in a plane at right angles to the axes of the shank and sleeve, respectively.

6. The combination defined in and according to claim 5, and wherein a limit stop member is friction-fitted but adjustable on a median portion of said shank, and compatible antifriction means orientated and interposed between said annular flange and a cooperating end of said limit stop member.

7. For use on the bit-equipped shank of a conventional type screwdriver, a guide assembly comprising, in combination, an axially bored end thrust and limit stop member adapted to be retentively but shiftably mounted on a median portion of said shank, an elongated rigid transparent sleeve having forward and rearward end portions, a bushing friction-fitted into the bore of the rearward end portion of said sleeve, said bushing having annular flange means abutting the coacting rearward end of said sleeve, and antifriction means interposed between said flange means and a cooperating end of said end thrust member.

8. The guide assembly defined in and according to claim 7, and wherein said antifriction means comprises a split washer adapted to surround said shank, said washer being opposed to said flange means, said flange means provided with pocketed antifriction ball bearings abutting said washer.

9. The guide assembly defined in and according to claim 8 and, in combination, screw holding and starting means temporarily and detachably connectible to the shank of a screw, said means being telescopingly but removably lodged in the forward end portion of the bore of said sleeve, whereby the screw can be orientated with the sleeve, bit, and work surface for starting the screw with the bit seated in the usual screwdriver kerf in the head of said screw.